United States Patent
Verma et al.

(10) Patent No.: US 11,797,716 B2
(45) Date of Patent: Oct. 24, 2023

(54) ATM ENCRYPTED SCREENS POWERED BY SMART GLASS FOR SCREEN DECRYPTION

(71) Applicant: Bank of America Corporation, Charlotte, NC (US)

(72) Inventors: Sandeep Verma, Gurugram (IN); Pavan Chayanam, Alamo, CA (US); Srinivas Dundigalla, Waxhaw, NC (US)

(73) Assignee: Bank of America Corporation, Charlotte, NC (US)

( * ) Notice: Subject to any disclaimer, the term of this patent is extended or adjusted under 35 U.S.C. 154(b) by 172 days.

(21) Appl. No.: 17/409,972

(22) Filed: Aug. 24, 2021

(65) Prior Publication Data

US 2023/0063406 A1 Mar. 2, 2023

(51) Int. Cl.

| | |
|---|---|
| *G06F 3/04883* | (2022.01) |
| *G06F 21/84* | (2013.01) |
| *H04W 12/033* | (2021.01) |
| *H04W 12/041* | (2021.01) |
| *H04W 12/0431* | (2021.01) |
| G06Q 20/32 | (2012.01) |
| G06Q 20/10 | (2012.01) |
| G06Q 20/38 | (2012.01) |
| G06Q 20/20 | (2012.01) |

(52) U.S. Cl.
CPC .......... *G06F 21/84* (2013.01); *G06F 3/04883* (2013.01); *H04W 12/033* (2021.01); *H04W 12/041* (2021.01); *H04W 12/0431* (2021.01); G06Q 20/1085 (2013.01); G06Q 20/206 (2013.01); G06Q 20/321 (2020.05); G06Q 20/327 (2013.01); G06Q 20/3221 (2013.01); G06Q 20/3829 (2013.01)

(58) Field of Classification Search
CPC .. G06F 21/84; G06F 3/04883; H04W 12/033; H04W 12/041; H04W 12/0431; H04W 12/03; G02B 2027/0178; G06Q 20/1085; G06Q 20/206; G06Q 20/321; G06Q 20/3221; G06Q 20/327; G06Q 20/3829
See application file for complete search history.

(56) References Cited

U.S. PATENT DOCUMENTS

2016/0314468 A1* 10/2016 Smith .................... G07F 7/1041
2020/0356989 A1* 11/2020 Shamai ................. H04L 9/0825
(Continued)

*Primary Examiner* — Michael Simitoski
*Assistant Examiner* — Andrew Suh
(74) *Attorney, Agent, or Firm* — Weiss & Arons LLP

(57) ABSTRACT

Apparatus and methods for unlocking a communication terminal. The methods may include: at the communication terminal, receiving from eye wear of a user, a radio frequency ("RF") signal that includes a public code. The methods may include: at the communication terminal, receiving from eye wear a request for text that is encrypted using the public code. The methods may include: responsive to the request, transmitting to the communication terminal encrypted text based on the public code. The methods may include displaying on the communication terminal the encrypted text. The methods may include detecting at the terminal, without displaying a decryption of the encrypted text, a user gesture based on the encrypted text. The methods may include providing to the user a private code corresponding to the public code. The private code may be configured to reside in machine readable memory on the eye wear.

19 Claims, 8 Drawing Sheets

(56) References Cited

U.S. PATENT DOCUMENTS

| | | | |
|---|---|---|---|
| 2021/0112411 A1* | 4/2021 | Pazhyannur | H04W 12/06 |
| 2021/0385067 A1* | 12/2021 | Yarabolu | G06F 3/0346 |
| 2022/0237280 A1* | 7/2022 | Hack | G02B 27/017 |

* cited by examiner

ATM ENCRYPTED SCREENS POWERED BY SMART GLASS FOR SCREEN DECRYPTION

BACKGROUND

An automated transaction machine ("ATM") typically displays unencrypted information, whether on the screen or on keys of a physical key pad. The ATM may be located in an open or common area such as a roadside, or in a shopping mall, cafeteria, hospital, school, and the like. Such conditions may make it difficult to conceal a user's sensitive information such as a personal identification number ("PIN"), account details and the like. For example, a thief at a distance may collect a user's information by viewing or photographing an ATM screen. The information may later be used fraudulently to access the user's funds or account.

Typical ATMS do not have the ability to provide to the user a view of the information in an unencrypted state, and, to the public, a view of the information in an encrypted state.

It would therefore be desirable to provide apparatus and methods for providing to a user a view of the transaction information in an unencrypted state, and, to the public, a view of the transaction information in an encrypted state.

BRIEF DESCRIPTIONS OF THE DRAWINGS

The objects and advantages of the invention will be apparent upon consideration of the following detailed description, taken in conjunction with the accompanying drawings, in which like reference characters refer to like parts throughout, and in which.

Figure 1:
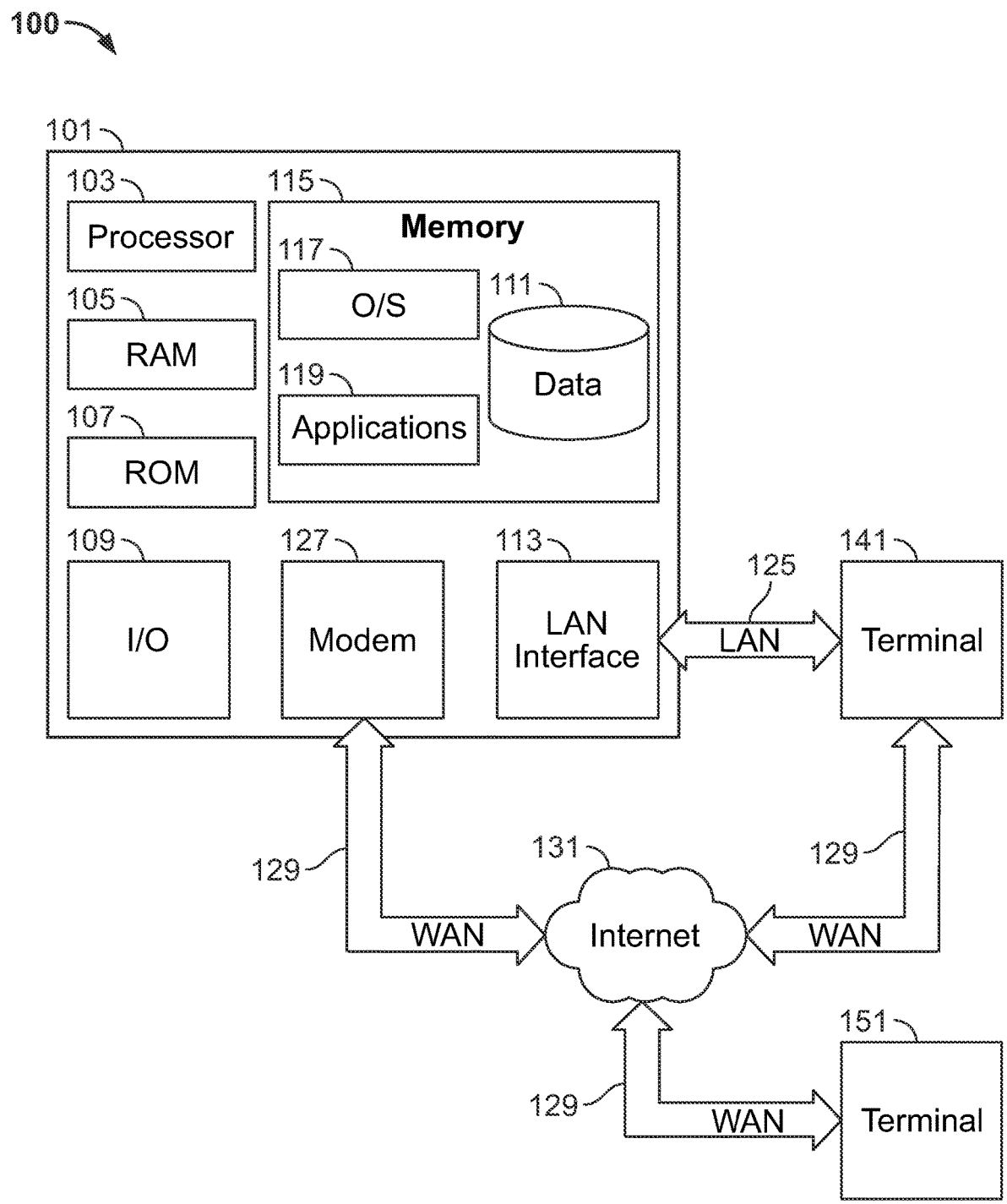
FIG. 1 shows illustrative apparatus in accordance with principles of the invention.

The leftmost digit (e.g., "L") of a three-digit reference numeral (e.g., "LRR"), and the two leftmost digits (e.g., "LL") of a four-digit reference numeral (e.g., "LLRR"), generally identify the first figure in which a part is called-out.

DETAILED DESCRIPTION

Apparatus and methods for methods for unlocking a communication terminal are provided. The apparatus and methods may involve providing a user with smart-glass-based eye wear. The apparatus and methods may involve generating a public/private key pair. A user having the eye wear may subscribe to requiring the key pair for permitting selected operations at the ATM.

The apparatus and methods may include one or more of the features listed in Table 1

TABLE 1

| Illustrative features |
|---|
| User's smart glass may have two keys, a private key and a public key |
| User may share smart glass public key with the bank |
| User may switch ON encrypted screen mode at ATM |
| After first level of authentication using facial recognition and smart glass Bluetooth based communication ATM may encrypt screen |
| ATM backend may extract user's smart glass encryption public key and encrypt the ATM character sets like 'a' will be displayed as $ etc. based on the public key that is encrypting it |
| Only user's smart glass, which has private key stored in it, may decrypt what is being displayed on the ATM screen basis of public/private key |
| User may see a decrypted screen view through smart glass and other people/cameras looking at the ATM screen may see an encrypted ATM screen |
| User may advance process by entering PIN using decrypted view of screen |
| Other suitable illustrative features |

The apparatus and methods may include methods for unlocking a communication terminal. The communication terminal may provide communication between a first communicating party and a second communicating party. The first communicating party may be an eye wear user. The second communicating party may be an enterprise. The second communicating party may be an individual.

The methods may include, at the communication terminal, receiving from eye wear of a user, a radio frequency ("RF") signal that includes a public code. The public code may include a public key. The methods may include, at the communication terminal, receiving from eye wear a request for text that is encrypted using the public code. The methods may include: responsive to the request, transmitting to the communication terminal encrypted text based on the public code. The methods may include displaying on the communication terminal the encrypted text. The methods may include detecting at the terminal, without displaying a decryption of the encrypted text, a user gesture based on the encrypted text.

The methods may include providing to the user a private code corresponding to the public code. The private code may include a private key.

The private code may be configured to reside in machine readable memory on the eye wear.

The gesture may include a screen-touch.

The screen-touch may include a touch of a display where the encrypted text appears.

The request may be performed by a user gesture.

The request may initiate in the communication terminal an acquisition, from the eye wear, of the public code.

The methods may include detecting, at the terminal, the user gesture, without receiving at the terminal the private code.

The methods transmitting to the communication terminal a first text color with which to display the encrypted text.

The methods transmitting to the communication terminal a first background color against which to display the encrypted text.

The methods transmitting to the eye wear a second text color with which to display the decrypted text. The methods transmitting to the eye wear a second background color against which to display the decrypted text. The second background color may match the first text color so that, as viewed through the eye wear, the encrypted text is hidden. The second text color may contrast with the second background color so that, as viewed through the eye wear, the decrypted text not hidden.

The methods may include detecting, at the terminal, from user eye wear, a beacon. The methods may include, in response to the detecting, authenticating a user. The methods may include at the communication terminal, receiving from eye wear of the user, a radio frequency ("RF") signal that includes a public code. The methods may include The methods may include transmitting to the communication terminal encrypted text based on the public code. The methods may include displaying on the communication terminal the encrypted text. The methods may include detecting at the terminal, without displaying a decryption of the encrypted text, a user gesture based on the encrypted text.

The methods may include providing to the user a private code corresponding to the public code.

The private code may be configured to reside in machine readable memory on the eye wear.

The gesture may include a screen-touch. The screen-touch includes a touch of a display where the encrypted text appears.

The methods may include detecting at the terminal the user gesture without receiving at the terminal the private code.

The methods may include transmitting to the communication terminal a first text color with which to display the encrypted text. The methods may include transmitting to the communication terminal a first background color against which to display the encrypted text. The methods may include transmitting to the to the eye wear a second text color with which to display the decrypted text. The methods may include transmitting to the to the eye wear a second background color against which to display the decrypted text. The second background color may match the first text color so that, as viewed through the eye wear, the encrypted text is hidden. The second text color may contrast with the second background color so that, as viewed through the eye wear, the decrypted text not hidden.

The methods may include receiving from a user a request for a communication channel between an eye wear instrument and a communication terminal. The methods may include generating a unique public-private key pair for the user. The methods may include transmitting the key pair to the eye wear instrument.

The methods may include receiving, at a communication terminal, from the instrument, a radio frequency ("RF") signal that includes the public code. The methods may include receiving, at a communication terminal a request for text that is encrypted using the public code. The methods may include, responsive to the request, transmitting to the communication terminal encrypted text based on the public code. The methods may include displaying on the communication terminal the encrypted text. The methods may include detecting at the terminal, without displaying a decryption of the encrypted text, a user gesture based on the encrypted text.

The methods may include providing to the user a private code corresponding to the public code. The private code may be configured to reside on the eye wear. The gesture may include a screen-touch.

The methods may include detecting at the terminal the user gesture without receiving at the terminal the private code.

The methods may include transmitting to the communication terminal a first text color with which to display the encrypted text. The methods may include transmitting to the communication terminal a first background color against which to display the encrypted text. The methods may include transmitting to the eye wear a second text color with which to display decrypted text derived from the encrypted text. The methods may include transmitting to the eye wear a second background color against which to display the decrypted text. The second background color may match the first text color so that, as viewed through the eye wear, the encrypted text is hidden. The second text color contrasts with the second background color so that, as viewed through the eye wear, the decrypted text not hidden.

FIG. 1 is a block diagram that illustrates a computing server 101 (alternatively referred to herein as a "server or computer") that may be used in accordance with the principles of the invention. The server 101 may have a processor 103 for controlling overall operation of the server and its associated components, including RAM 105, ROM 107, input/output ("I/O") module 109, and memory 115.

I/O module 109 may include a microphone, keypad, touchscreen and/or stylus through which a user of server 101 may provide input, and may also include one or both of a speaker for providing audio output and a video display device for providing textual, audiovisual and/or graphical output. Software may be stored within memory 115 and/or other storage (not shown) to provide instructions to processor 103 for enabling server 101 to perform various functions. For example, memory 115 may store software used by server 101, such as an operating system 117, application programs 119, and an associated database 111. Alternatively, some or all of computer executable instructions of server 101 may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks.

When used in a LAN networking environment, server 101 is connected to LAN 125 through a network interface or adapter 113.

When used in a WAN networking environment, server 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Additionally, application program 119, which may be used by server 101, may include computer executable instructions for invoking user functionality related to communication, such as email, short message service (SMS), and voice input and speech recognition applications.

Computing server 101 and/or terminals 141 or 151 may also be mobile terminals including various other components, such as a battery, speaker, and antennas (not shown). Terminal 151 and/or terminal 141 may be portable devices such as a laptop, tablet, smartphone or any other suitable device for receiving, storing, transmitting and/or displaying relevant information.

Any information described above in connection with database 111, and any other suitable information, may be stored in memory 115. One or more of applications 119 may include one or more algorithms that may be used to perform the functions of one or more of a smart glass eye wear and an ATM, and perform any other suitable tasks.

The apparatus and methods may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The apparatus and methods may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
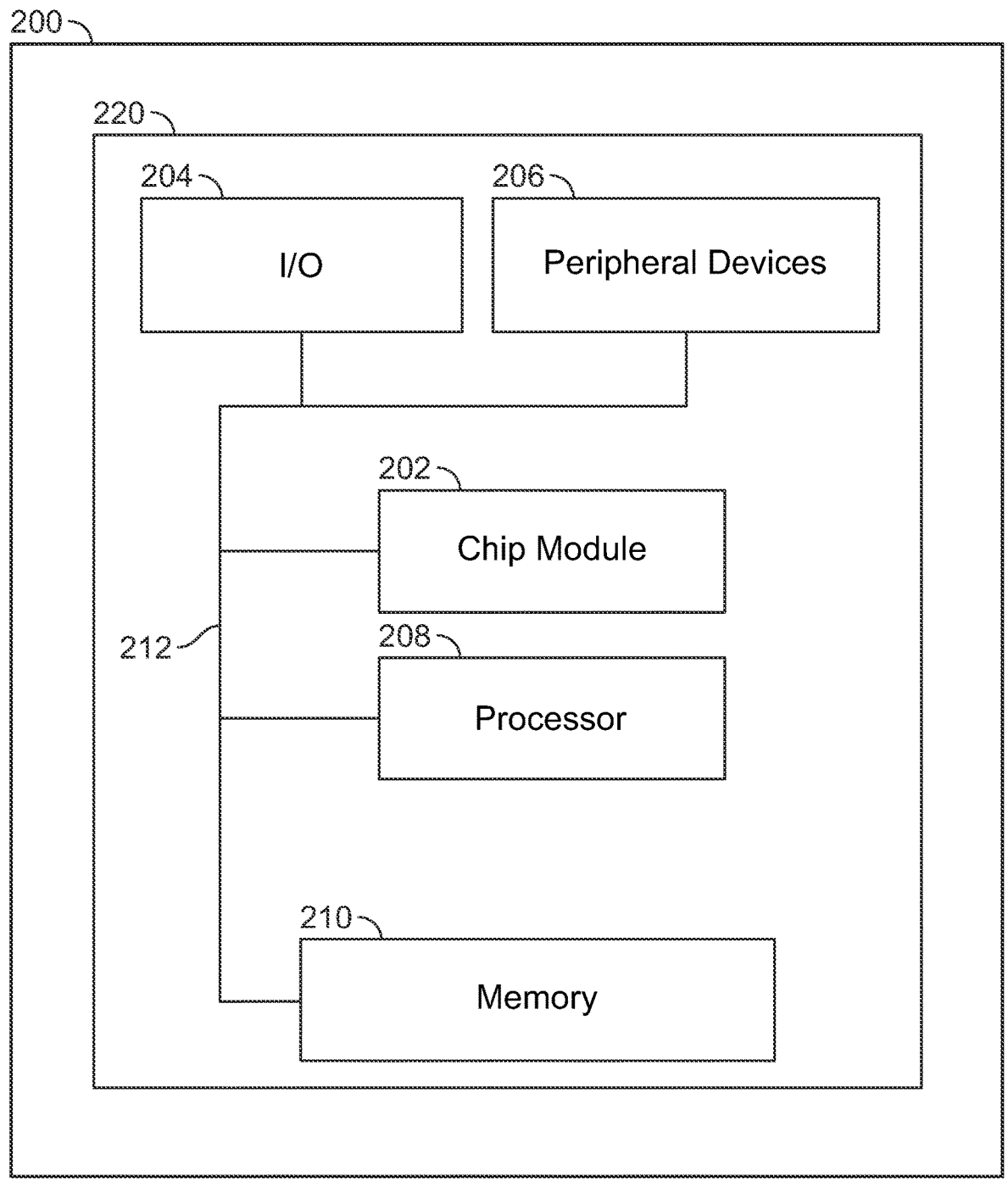
FIG. 2 shows illustrative apparatus in accordance with principles of the invention.

FIG. 2 shows illustrative apparatus 200 that may be configured in accordance with the principles of the invention.

Apparatus 200 may be a computing machine. Apparatus 200 may include one or more features of the apparatus that is shown in FIG. 1.

Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may solve equations and perform other methods described herein; and machine-readable memory 210.

Machine-readable memory 210 may be configured to store in machine-readable data structures associated with transaction information and any other suitable information or data structures.

Components 202, 204, 206, 208 and 210 may be coupled together by a system bus or other interconnections 212 and may be present on one or more circuit boards such as 220. In some embodiments, the components may be integrated into a single chip.

The chip may be silicon-based.

Figure 3:
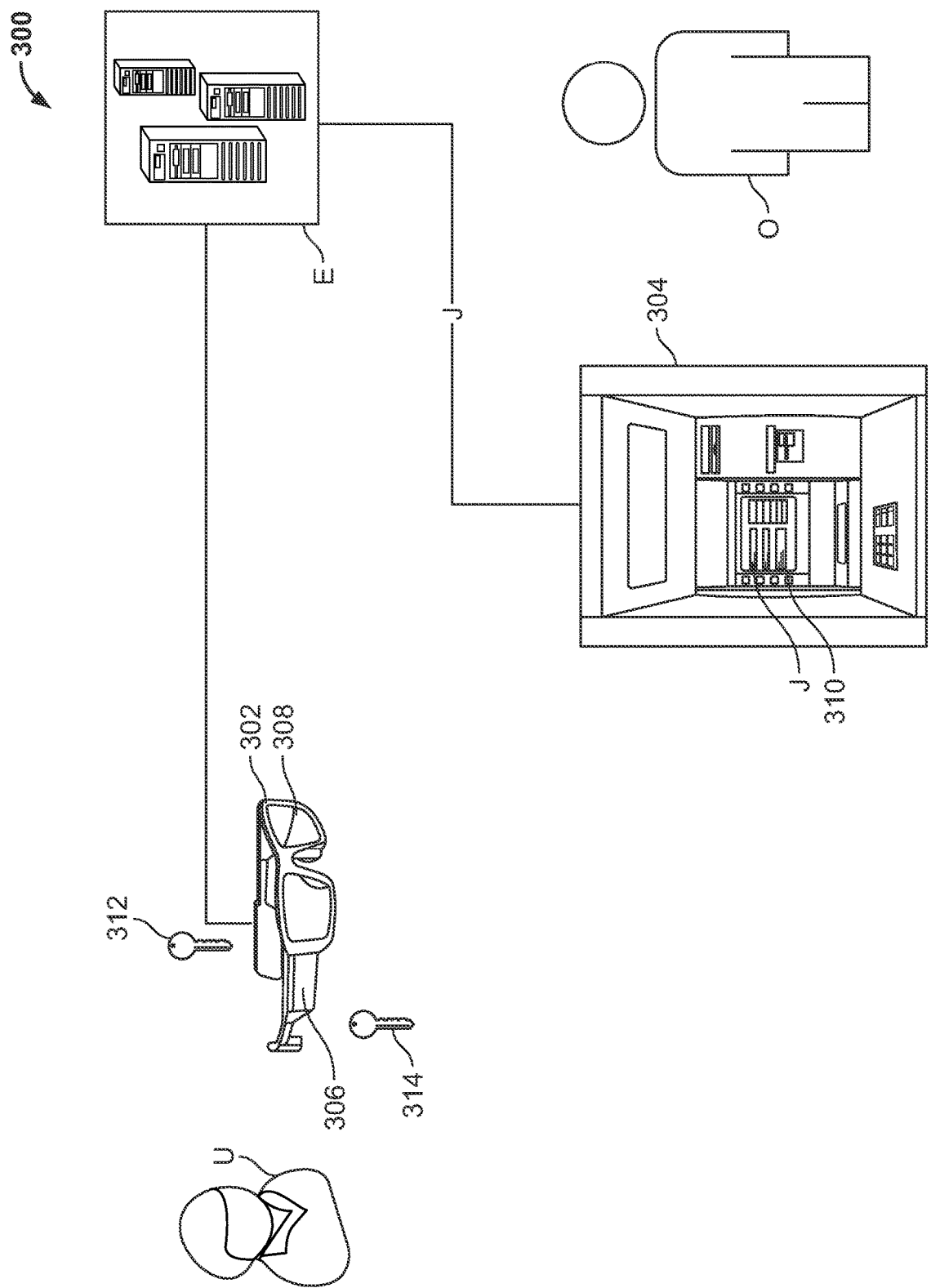
FIG. 3 shows an illustrative schema in accordance with principles of the invention.

FIG. 3 shows illustrative architecture 300 for unlocking a communication terminal. Architecture 300 may include eye wear 302. Architecture 300 may include communication terminal 304. Communication terminal 304 may provide communication between a first communicating party and a second communicating party. The first communicating party may be user U. The second communicating party may be enterprise E.

Eye wear 302 may include optical glasses. Eye wear 302 may include wearable frame 306. Eye wear 302 may include one or more smart glass display such as smart glass display 308. Eye wear may include one or more of the features shown or described in connection with FIGS. 1 and 2.

Terminal 304 may include an automated transaction machine ("ATM"). Terminal 304 may include terminal display 310.

Eye wear 302 may transmit to enterprise E public key 312.

Enterprise E may transmit information J to display 310. Information J may be an encrypted representation of information I (not shown). Enterprise E may transform information I into information J. Enterprise E may transform information I into information J based on an encryption scheme defined by public key 312. Display 310 may display information I. Observer O may observe display 310. Observer O may view information J.

User U may wear eye wear 302. User U may view display 310 through smart glass display 308. Eye wear 302 may receive an image of information J through smart glass display 308. Eye wear 302 may invert information J into information I. Eye wear 302 may invert information J into information I based on a decryption scheme defined by private key 314. Eye wear 302 may display information I on smart glass display 308. User U may view information I on smart glass display 308.

User U may perform a gesture in response to information I. Communication terminal 304 may transmit a signal to enterprise E. The signal may correspond to the gesture. In response to receipt of the gesture, enterprise E may transmit supplemental encrypted information to communication terminal 304. User U may respond to the supplemental encrypted information.

Eye wear 302 may generate public key 312 and private key 314. Enterprise E may generate public key 312 and private key 314.

Information J may include password protection information. The password protection information may be used to unlock communication terminal 304. Information J may be used for performing an information exchange between use U and enterprise E.

Figure 4:
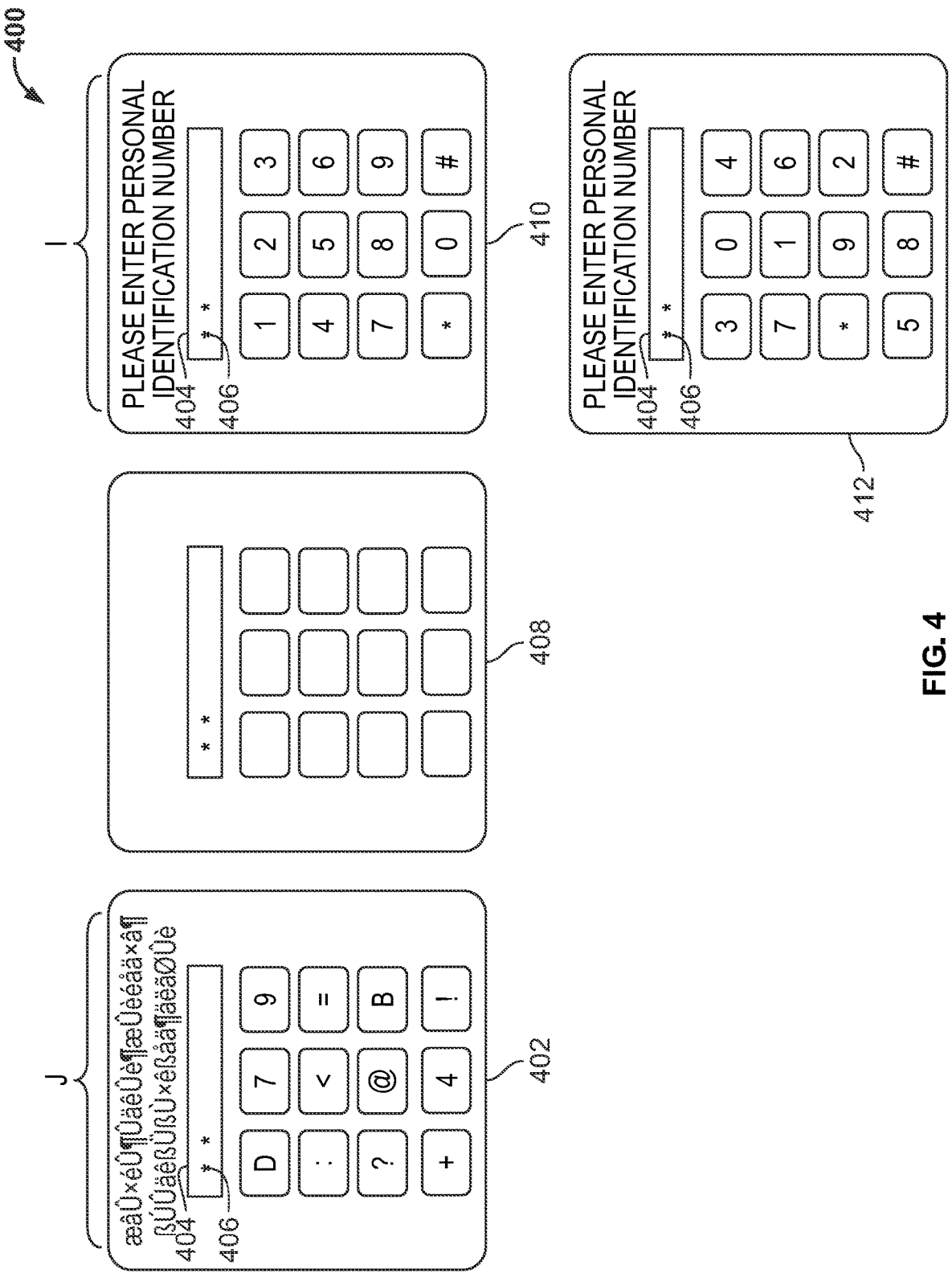
FIG. 4 shows illustrative information in accordance with principles of the invention.

FIG. 4 shows illustrative display views 400 for unlocking a communication terminal. View 402 is a view that may be shown on communication terminal display 310. View 402 shows information J. Field 404 shows indications such as 406. Indications 406 may indicate input received from user U. Information J may be defined as excluding indications 406.

View 408 is a view that may be shown on smart glass display 308. View 408 shows, through smart glass display 308, display 310, but with information J masked out.

View 410 is a view that may be shown on smart glass display 308. View 408 shows, through smart glass display 308, display 310, with information J masked out as in view 408, and information I.

View 412 is a view that may be shown on smart glass display 308. View 412 shows, through smart glass display 308, display 310, with information J masked out as in view 408, and information I in a different arrangement than that in which information is displayed in view 410. The gestures that user U makes to respond to information I may be keyed to the arrangement in view 412. A corresponding process on communication terminal may be present to link gestures made in response to the arrangement of view 412 to the corresponding elements shown in arrangement 410.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

For the sake of illustration, the steps of the illustrated processes will be described as being performed by a "system." A "system" may include one or more of the features of the apparatus and schemas that are shown in FIG. 1-FIG. 4 and/or any other suitable device or approach. The "system" may include one or more means for performing one or more of the steps described herein.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative methods steps may be combined. For example, an illustrative process may include steps shown in connection with another illustrative process.

Figure 5:
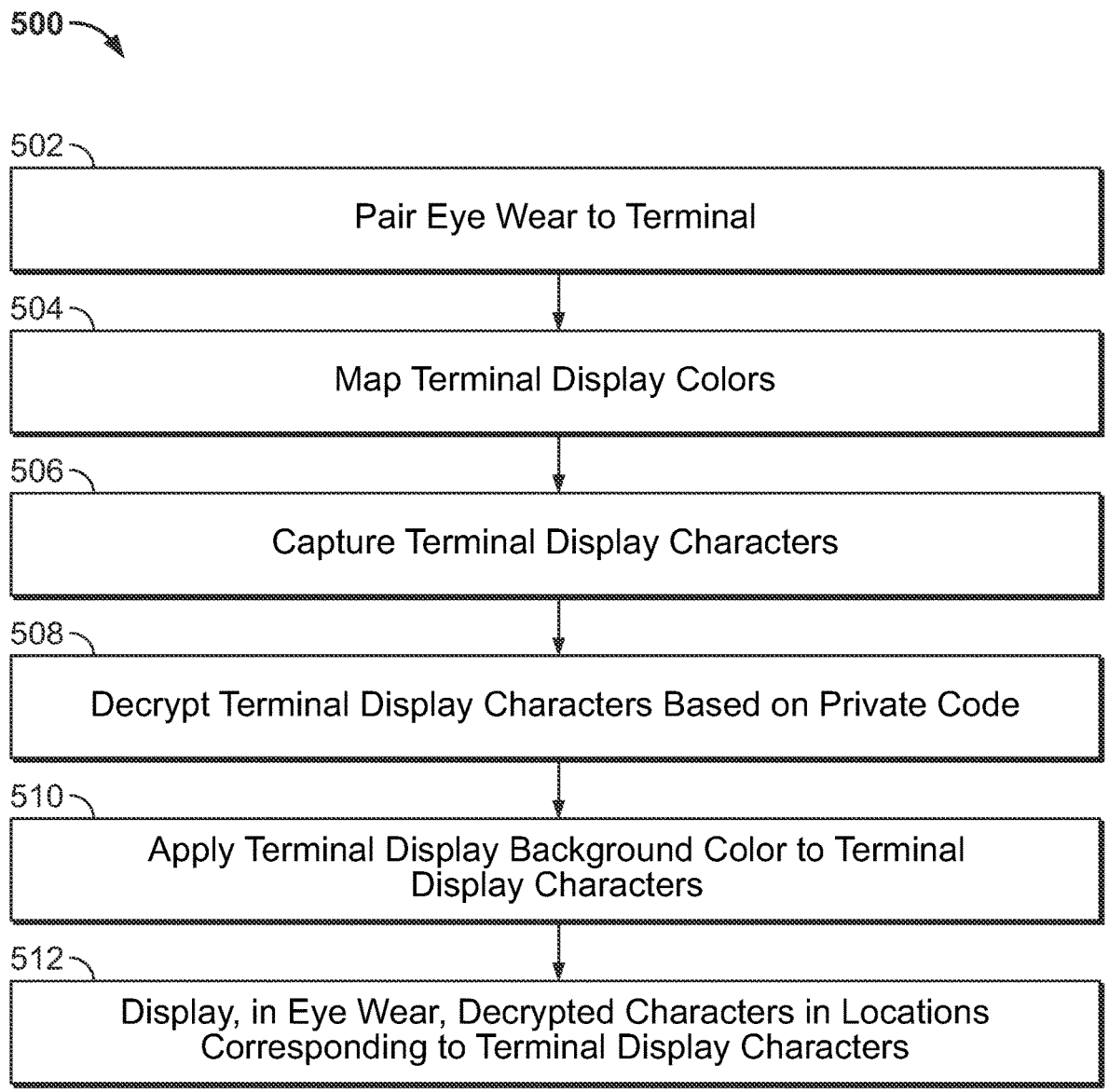
FIG. 5 shows an illustrative process in accordance with principles of the invention.

FIG. 5 shows illustrative process 500 for unlocking a communication terminal. At step 502, the system may pair eye wear to terminal. At step 504, the system may map terminal display colors. At step 506, the system may capture terminal display characters. At step 508, the system may decrypt terminal display characters based on private code. At step 510, the system may apply terminal display background color to terminal display characters. At step 512, the system may apply terminal display background color to terminal display characters.

Figure 6:
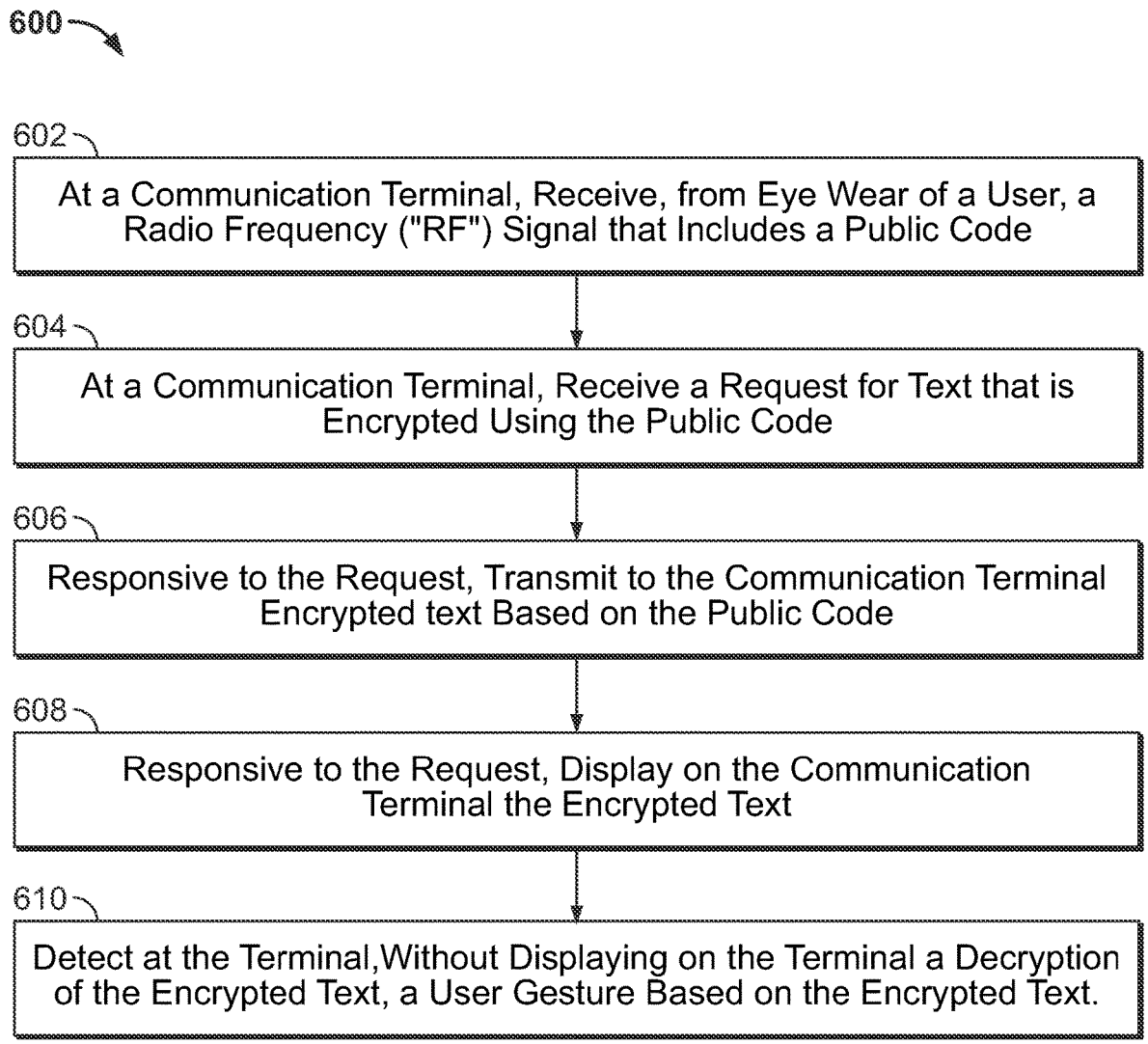
FIG. 6 shows an illustrative process in accordance with principles of the invention.

FIG. 6 shows illustrative process 600 for unlocking a communication terminal. At step 602, the system may, at a communication terminal, receive, from eye wear of a user, a radio frequency ("RF") signal that includes a public code. At step 604, the system may, at the communication terminal, receive a request for text that is encrypted using the public code. At step 606, the system may, responsive to the request, transmit to the terminal encrypted text based on the public code. At step 608, the system may, responsive to the request, display on the terminal the encrypted text. At step 610, the system may detect at the terminal, without displaying on the terminal a decryption of the encrypted text, a user gesture based on the encrypted text.

Figure 7:
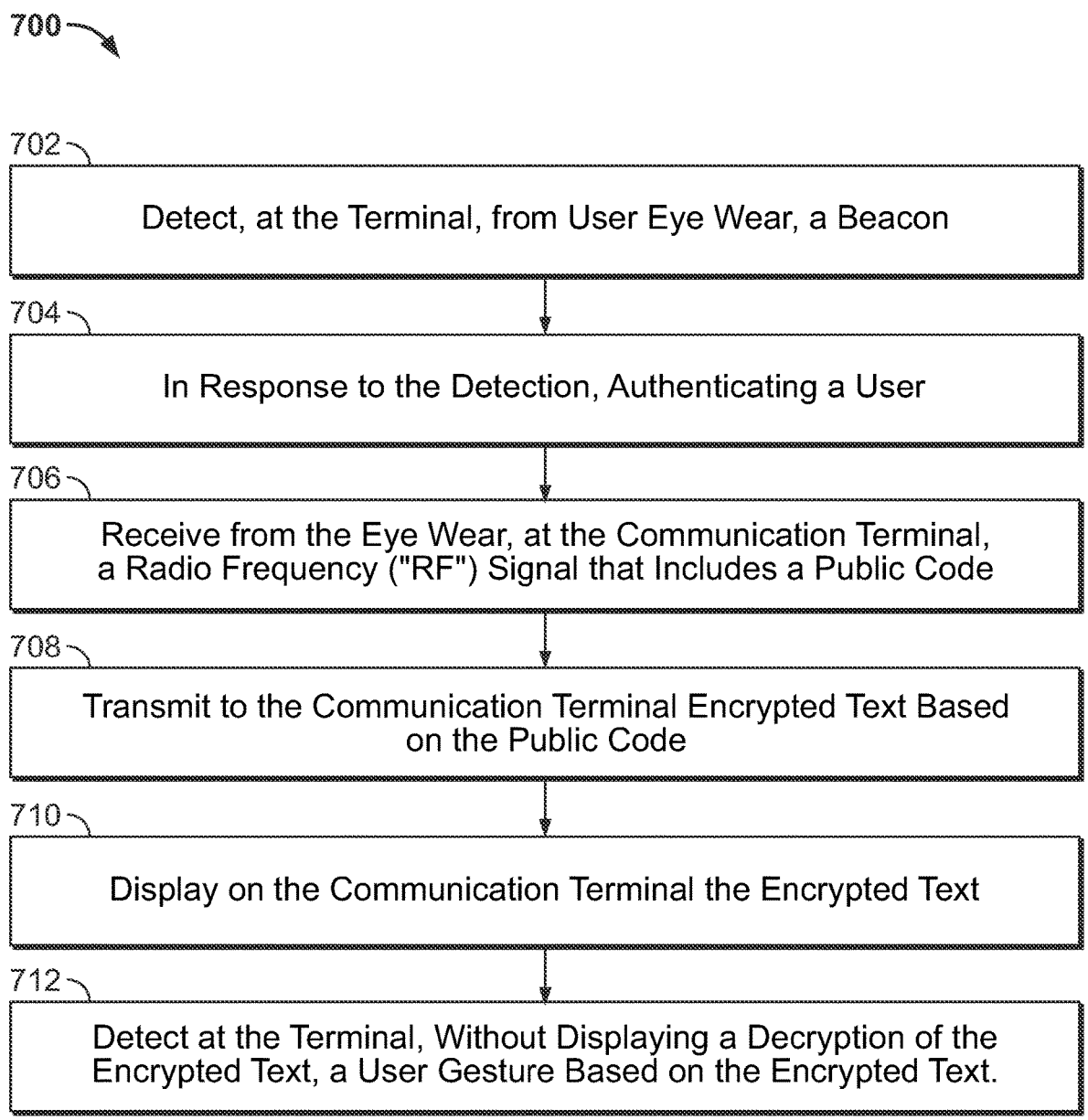
FIG. 7 shows an illustrative process in accordance with principles of the invention.

FIG. 7 shows illustrative process 700 for unlocking a communication terminal. At step 702, the system may detect, at the terminal, from user eye wear, a beacon. At step 704, the system may, in response to the detection, authenticating a user. At step 706, the system may receive from the eye wear, at the communication terminal, a radio frequency ("RF") signal that includes a public code. At step 708, the system may transmit to the communication terminal encrypted text based on the public code. At step 710, the system may display on the communication terminal the encrypted text. At step 712, the system may detect at the terminal, without displaying a decryption of the encrypted text, a user gesture based on the encrypted text.

Figure 8:
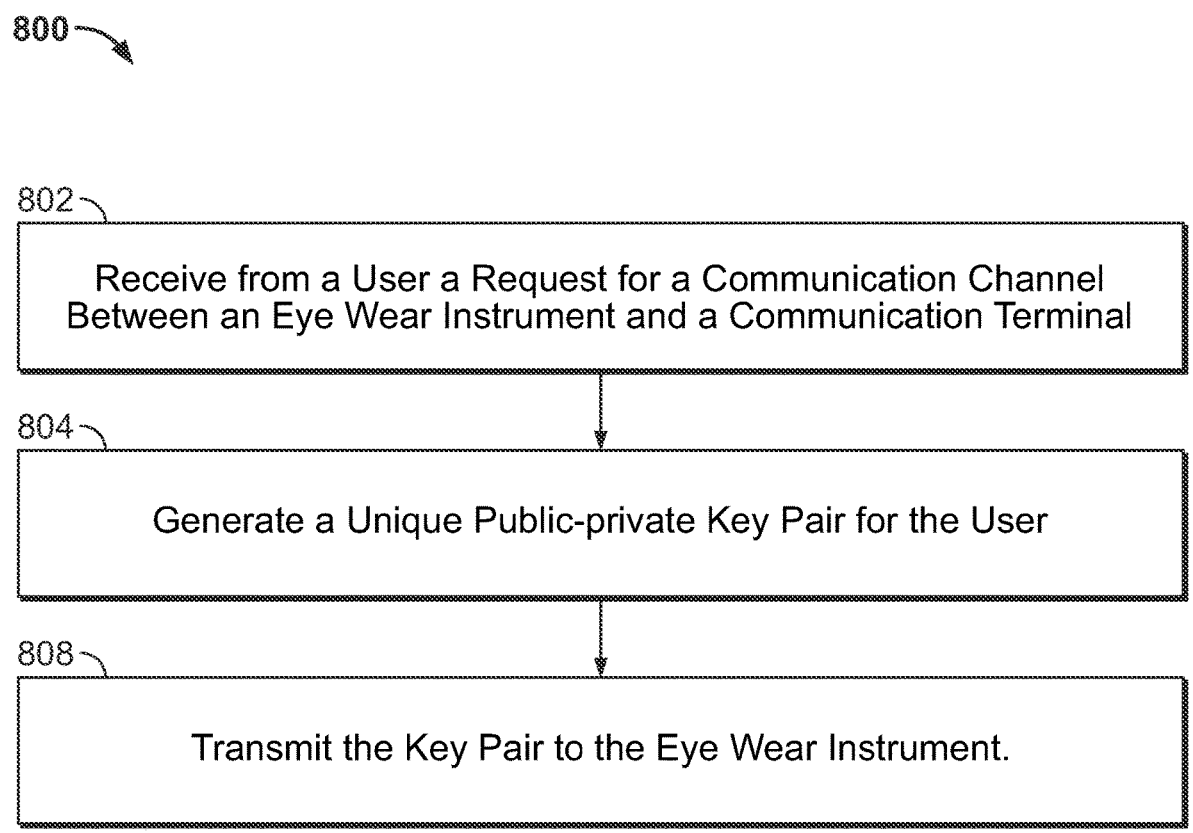
FIG. 8 shows an illustrative process in accordance with principles of the invention.

FIG. 8 shows illustrative process 800 for unlocking a communication terminal. At step 802, the system may detect, at the terminal, from user eye wear, a beacon. At step 804, the system may generate a unique public-private key pair for the user. At step 806, the system may transmit the key pair to the eye wear instrument.

The eye wear may generate a unique public-private key pair for the user.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Thus, methods and apparatus for unlocking a communication terminal have been provided. Persons skilled in the art will appreciate that the present invention may be practiced by other than the described embodiments, which are presented for purposes of illustration rather than of limitation.

What is claimed is:

1. A method for unlocking a communication terminal, the method comprising:
at the communication terminal, receiving:
from eye wear of a user, a radio frequency ("RF") signal that includes a public code; and
a request for text that is encrypted using the public code;
responsive to the request:
transmitting to the communication terminal encrypted text based on the public code;
displaying on the communication terminal the encrypted text; and
detecting at the communication terminal, without displaying a decryption of the encrypted text, a user gesture based on the encrypted text;
wherein the transmitting of the encrypted text comprises transmitting:
to the communication terminal:
a first text color with which to display the encrypted text; and
a first background color against which to display the encrypted text and
to the eye wear:
a second text color with which to display the decrypted text; and
a second background color against which to display the decrypted text; wherein:
the second background color matches the first text color so that, as viewed through the eye wear, the encrypted text is hidden; and
the second text color contrasts with the second background color so that, as viewed through the eye wear, the decrypted text not hidden.

2. The method of claim 1 further comprising providing to the user a private code corresponding to the public code.

3. The method of claim 2 wherein the private code is configured to reside on the eye wear.

4. The method of claim 2 further comprising detecting at the communication terminal the user gesture without receiving at the communication terminal the private code.

5. The method of claim 1 wherein the gesture is a screen-touch.

6. The method of claim 5 wherein the screen-touch includes a touch of a display where the encrypted text appears.

7. The method of claim 1 wherein the request is performed by a user gesture.

8. The method of claim 1 wherein the request initiates in the communication terminal an acquisition, from the eye wear, of the public code.

9. A method for unlocking a communication terminal, the method comprising:

detecting, at the communication terminal, from user eye wear, a beacon;

in response to the detecting, authenticating a user;

at the communication terminal, receiving from eye wear of the user, a radio frequency ("RF") signal that includes a public code;

transmitting to the communication terminal encrypted text based on the public code;

displaying on the communication terminal the encrypted text; and detecting at the communication terminal, without displaying a decryption of the encrypted text, a user gesture based on the encrypted text;

wherein the transmitting of the encrypted text comprises transmitting:

to the communication terminal:

a first text color with which to display the encrypted text; and a first background color against which to display the encrypted text and to the eye wear:

a second text color with which to display the decrypted text; and a second background color against which to display the decrypted text;

wherein:

the second background color matches the first text color so that, as viewed through the eye wear, the encrypted text is hidden; and the second text color contrasts with the second background color so that, as viewed through the eye wear, the decrypted text not hidden.

10. The method of claim 9 further comprising providing to the user a private code corresponding to the public code.

11. The method of claim 10 wherein the private code is configured to reside on the eye wear.

12. The method of claim 9 wherein the gesture is a screen-touch.

13. The method of claim 12 wherein the screen-touch includes a touch of a display where the encrypted text appears.

14. The method of claim 10 further comprising detecting at the communication terminal the user gesture without receiving at the communication terminal the private code.

15. A method for unlocking a communication terminal, the method comprising:

receiving from a user a request for a communication channel between an eye wear instrument and a communication terminal;

generating a unique public-private key pair for the user; and transmitting the key pair to the eye wear instrument;

receiving at the communication terminal:

from the instrument, a radio frequency ("RF") signal that includes the public code; and a request for text that is encrypted using the public code;

responsive to the request, transmitting to the communication terminal encrypted text based on the public code;

displaying on the communication terminal the encrypted text; and detecting at the communication terminal, without displaying a decryption of the encrypted text, a user gesture based on the encrypted text;

wherein the transmitting of the encrypted text comprises transmitting:

to the communication terminal:

a first text color with which to display the encrypted text; and a first background color against which to display the encrypted text; and to the eye wear instrument:

a second text color with which to display the decrypted text; and a second background color against which to display the decrypted text;

wherein:

the second background color matches the first text color so that, as viewed through the eye wear instrument, the encrypted text is hidden; and the second text color contrasts with the second background color so that, as viewed through the eye wear instrument, the decrypted text not hidden.

16. The method of claim 15 further comprising providing to the user a private code corresponding to the public code.

17. The method of claim 16 wherein the private code is configured to reside on the eye wear instrument.

18. The method of claim 15 wherein the gesture is a screen-touch.

19. The method of claim 18 further comprising detecting at the communication terminal the user gesture without receiving at the communication terminal the private code.

* * * * *